April 17, 1956     W. P. MATTHEW ET AL     2,741,828
COMPOSITE METAL STRUCTURE
Filed Aug. 31, 1951     3 Sheets-Sheet 1
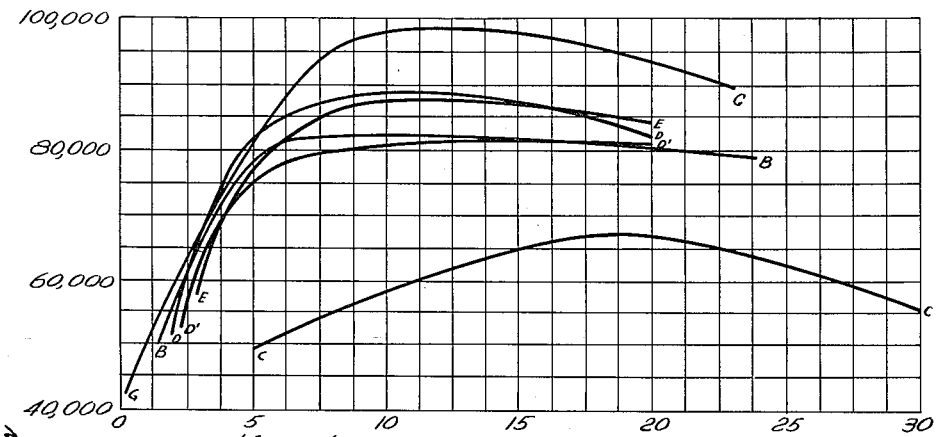
Fig. 1
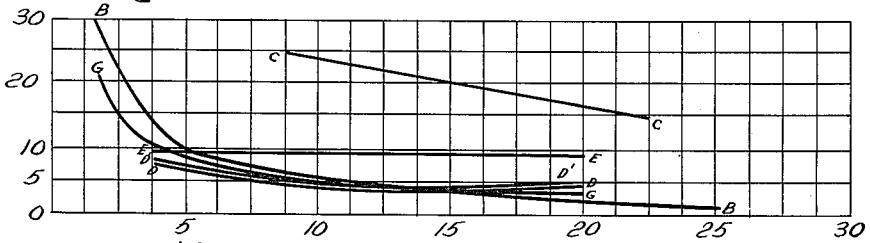
Fig. 2
Fig. 3
Fig. 4
Inventors
Lyman F. Whitney
William P. Matthew
by Roberts, Cushman & Grover
Att'ys.

April 17, 1956 W. P. MATTHEW ET AL 2,741,828
COMPOSITE METAL STRUCTURE
Filed Aug. 31, 1951 3 Sheets-Sheet 2

Inventors
Lyman F. Whitney
William P. Matthew
by Roberts, Cushman & Grover
Att'ys.

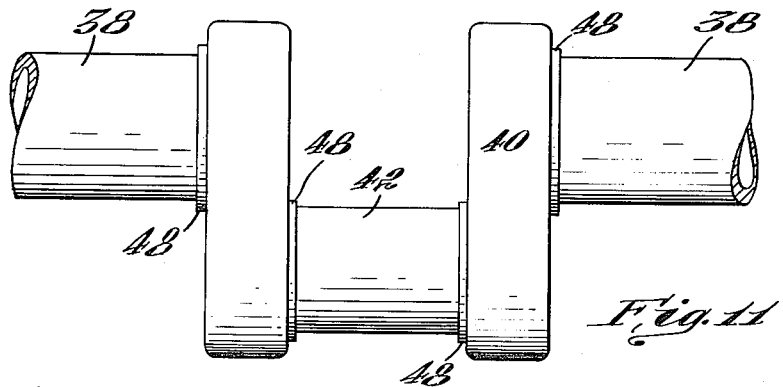
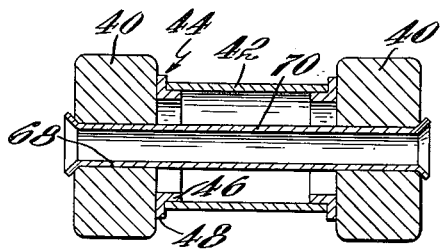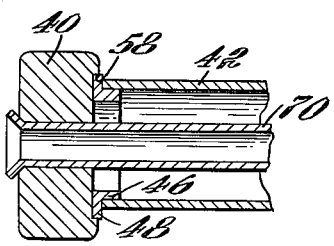
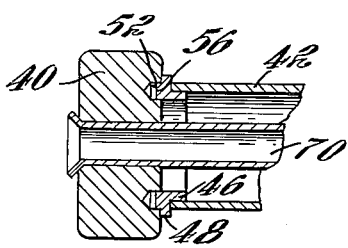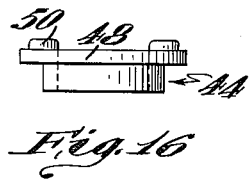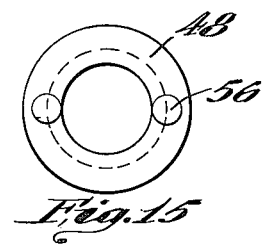
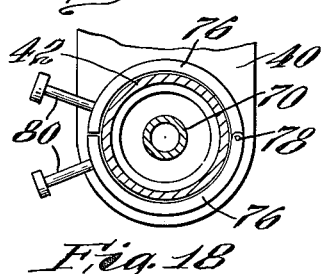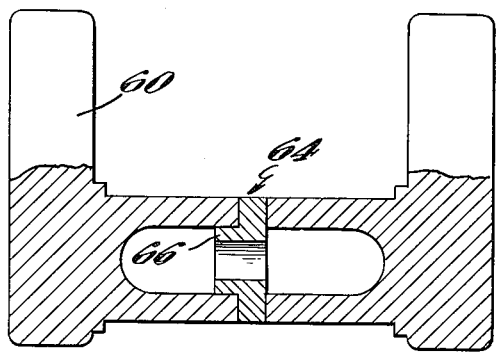
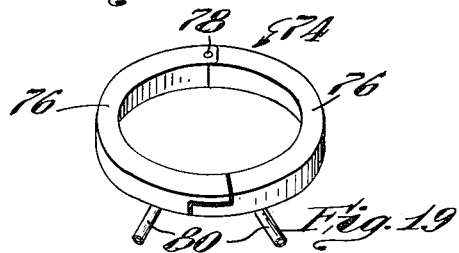

United States Patent Office 2,741,828
Patented Apr. 17, 1956

2,741,828

COMPOSITE METAL STRUCTURE

William P. Matthew, Washington, R. I., and Lyman F. Whitney, Boston, Mass., assignors, by mesne assignments, to Isthmian Metals, Inc., a corporation of Massachusetts Application August 31, 1951, Serial No. 244,584

4 Claims. (Cl. 29—191.2)

This invention relates to composite structures and more especially to structures made of two or more metal parts which may or may not be parts of a crankshaft, joined together in accordance with the teaching disclosed in our pending application, Ser. No. 198,614, filed December 1, 1950, now abandoned, for Crankshaft and Method of Making the Same. In the foregoing application, connector elements are used to join the adjacent surfaces of the component parts of the structure which is to be fabricated, which consist essentially of a preformed, powdered metal compact composed of 5% to ⅔ part of a low melting constituent and from 95% to ⅓ part of a high melting constituent. The high melting constituent of the elements consists of a ferrous metal and forms a shape-retaining, skeletal structure which becomes bonded to the parts by the low melting constituent, the latter consisting of a metal selected from the group consisting of copper, bronze, and copper-tin mixtures in which the copper predominates. The present invention involves the use of connector elements of the foregoing kind placed between the adjacent parts and bonded thereto and is characterized in that at least one of the component parts of a pair of adjacent component parts to be joined has an opening therein bordered by a surface opposite which is located the other component, and that the connector element for joining the parts has a bonding portion extending into the opening, which is of such shape as to have intimate surface contact with a substantial area of the internal surface of the opening and is bonded thereto. The other component may also have an opening therein substantially in registry with the opening in the first component and in this case, the connector element has bonding portions extending into both of the openings of such shape as to have intimate engagement with their internal surfaces and are bonded thereto. The opposed bordering surfaces of the component parts surrounding the openings may be spaced from each other, in which case the connector element may have a flange-like bonding section integral therewith extending between the opposed surfaces which is intimately bonded to the opposing surfaces.

The invention will now be described in more detail and as illustrated specifically herein with reference to the accompanying drawings in which:

Fig. 1 is a group of curves showing the way the tensile strength varies as the percentages of bronze in the iron and bronze powder mixture is varied;

Fig. 2 is a group of curves showing the way the elongation varies as the percentages of bronze in the iron and bronze powder mixture is varied;

Fig. 3 is a group of curves showing the way the density varies as the percentages of bronze in the iron and bronze powder mixture is varied and for two different heating periods;

Fig. 4 is a group of curves showing tensile strength in pounds per square inch of a given mixture of iron and powder plotted against various repressing pressures;

Fig. 11 is an elevational view longitudinally of a portion of a conventional crankshaft showing a pair of crank arms and a crank pin fixed between the ends of the crank arms;

Fig. 12 is a somewhat enlarged view of the end portions of the crank arms and the crank pin in section to show the connector elements for joining the crank and the crank pin in abutting relationship;

Fig. 13 is a fragmentary portion in the vicinity of an end of the crank arm and pin showing the connector element provided with complementary locating means;

Fig. 14 is a similar fragmentary section showing a slightly modified construction wherein the connector element is seated in a shallow recess in the crank;

Fig. 15 is a plan view of the connector element for crankshaft assemblies showing the locating means;

Fig. 16 is an elevation of the connector element shown in plan in Fig. 15;

Fig. 17 is a section through an alternative form of crankshaft wherein the crank arms and bearings or pins are formed integral;

Fig. 18 is a view taken transversely of a crankpin looking toward a crank showing a heater element surrounding the joint at the junction of the pin and crank; and Fig. 19 shows an isometric view of a conventional form of induction heater element of suitable construction to be used in fusing the connector element.

Figure 5:
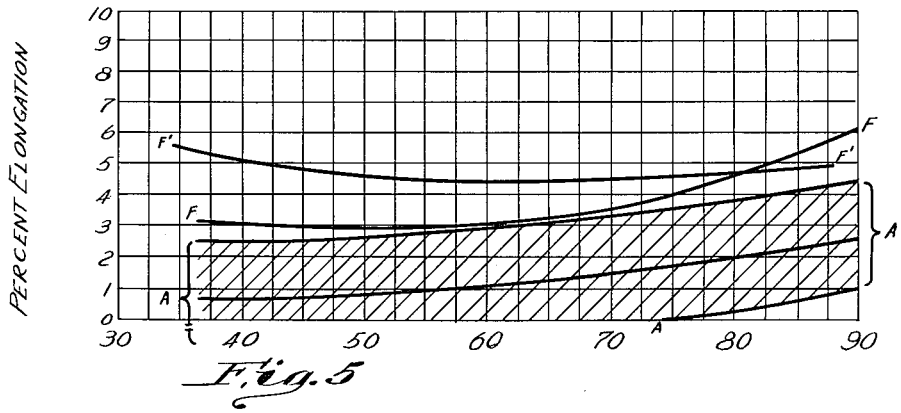
Fig. 5 is a group of curves showing percent elongation of a given mixture of iron and bronze plotted against various repressing pressures.

The connector element is a rigid, shape-retaining body preshaped to the required dimensions for use with the parts to be joined, as will hereinafter be described with respect to specific applications. The element, in accordance with my pending application, is made of iron powder and powdered copper, a copper and tin mix or a prealloyed bronze, preferably the latter, by intimately mixing the powder in a conical blender or ball mill in the proper proportions. In the mixture, the non-ferrous metal is present in an amount of about 5% to about ⅔ of the total weight of mixture. Satisfactory results have been obtained with as little as 5% non-ferrous and as much as ⅔ non-ferrous, but a range of 10 to 30% is preferred, and in this range 20% bronze seems to afford the best results as now determined. While a —100 mesh powder is preferred, powder having a higher percentage of fines may be employed with the advantage that a somewhat stronger product may result, but with the disadvantages that finer powders cost more and do not flow as readily in automatic compacting machines. Bronze, having the composition of 10% tin, 90% copper is preferred and may be in the form of prealloyed powder, or may be a mixture of tin powder with copper powder. The non-ferrous powder should contain at least approximately 60% copper. The preferred iron powder is electrolytic iron which normally has a very low percentage of total impurities, that is, .1% or less, although other less pure powders having at least as much as 2% to 5% total impurities and as much as 2% carbon can be used when some loss of ductility can be accepted. The iron and bronze powders are intimately mixed together with a suitable lubricant such as 1% stearic acid, and the mixture is then poured into a molding die and compressed between punches, preferably in automatic powder pressing equipment. An initial forming pressure in a range 15 to 40 tons per square inch, but preferably at approximately 30 tons per square inch, forms the powder into a coherent body typified in that it is a mechanical, unalloyed, intimate mixture of iron powder and bronze or copper powder, or iron, copper and tin powders in the proportions referred to above. The prepressed, unalloyed, coherent body is then given a first sintering at a temperature in the range 1200° to 1900° F., preferably at approximately 1500° F. for one quarter to three hours, but preferably about one hour while in a protective reducing atmosphere such as hydrogen, cracked ammonia, or endothermic producer gas which serves to drive off the lubricant, relieve the hardness which has been introduced by the first pressing, and to form a rigid body in which the particles of iron and bronze remain substantially unalloyed but are nevertheless sintered together. Optionally the sintered connector is then repressed or coined in a press at a pressure of from 50 to 100 tons per square inch, the preferred portion of the range being approximately 60 to 80 tons per square inch. In the pressing operation it is preferable to keep the body under a decreased pressure while it is being ejected from the die. This step is useful in keeping the body uniform throughout; otherwise it may become distorted in part.

When a connector element made up of the constituents referred to above is utilized between two members to be joined and heated to a temperature which exceeds the melting point of the lower melting point constituent of the element, this constituent becomes molten and alloys with other constituents of the element and with the adjoining surfaces of the members which are to be joined. During the bonding period when the lower melting constituent is liquid, the higher melting constituent retains the shape of the body as a whole, forming a rigid, skeletal-like structure which holds the parts to be joined in their original positions during consummation of the junction. Since the element includes a material which normally is softer than the members being joined, any surface inequalities and residual spaces between the members and the element are taken up during expansion thereof by squeezing of the softer metal of the element into these irregularities and spaces.

Upon cooling, the molten constituent solidifies, and the surfaces which were wetted by the molten metal are left securely bonded together.

Any convenient heating apparatus may be employed to accomplish bonding of the members; that is, the assembled members may be placed in a furnace and brought up to a temperature high enough to melt the lower melting powder or the heat may be applied locally by resistance heating or induction coils, as will appear hereinafter.

Below there follow specific examples of connector elements made with various proportions of ferrous and non-ferrous powders.

*Example 1*

One-third part ferrous powder was mixed with ⅔ part bronze powder consisting of 90% copper and 10% tin in a conical blender to secure an intimate powder mixture while mixtures were then compacted at 27 tons per square inch. The compact so formed was then sintered in dry dissociated ammonia for one hour at 1500° F. and then second pressed at 50 tons per square inch to form connector elements. Other connector elements were made from the same powder mix by compacting the powder at 45 tons per square inch and sintered for one hours at 1500° F. in dry dissociated ammonia. The connector elements so formed were in the shape of a wafer-like element 84/100 inch in diameter and about 1/10 inch thick, the double pressed elements being slightly thinner than the single. One of the connector elements which had been double pressed as above and another which had been single pressed and sintered as above were placed in a furnace and subjected to heat treatment for ½ hour at a temperature of approximately 2000° F. which corresponds to the bonding temperature used when bonding the component parts of an assembly by means of these connector elements. When cooled after such heat treatment the parts were found to have retained their original shape. Since at the bonding temperature the bronze was liquid and since the elements after heat treatment retained their shape it is evident that the skeletal-like structure existed during the period when the bronze was molten.

*Example 2*

One-third part ferrous powder was mixed with ⅔ part copper powder to form elements by the following procedure: A conical blender was used to secure an intimate mixture of the two powders which mixture was then compacted at 27 tons per square inch. The compact so formed was then sintered in dry dissociated ammonia for one hour at 1500° F. and then second pressed at 50 tons per square inch to form connector elements. Other connector elements were made by compacting the same powder mix at 45 tons per square inch and then sintering the compact at 1500° F. for one hour in dry dissociated ammonia. The connector elements so formed were in the shape of a wafer-like element 84/100 inch in diameter and approximately 1/10 inch thick. One of the connector elements which had been double pressed as above and another which had been single pressed and sintered as above were placed in a furnace and subjected to heat treatment for ½ hour at a temperature of approximately 2050° F. which corresponds to the bonding temperature used when bonding the component parts of an assembly by means of these connector elements. When cooled after such heat treatment the parts were measured and it was found that they retained their original shape. Since at the bonding temperature the copper was liquid and since the elements after heat treatment retained their size and shape it is evident that the skeletal-like structure existed during the period when the copper was molten.

Instead of a mixture of ⅓ part ferrous powder and ⅔ part copper powder elements of the size and made by exactly the same procedure as outlined above from an intimate mixture comprising:

1. 80% ferrous powder and 20% copper powder.
2. 95% ferrous powder and 5% copper powder.

Both the single pressed and double pressed variety retained their original shape after being subjected to heat treatment for ½ hour at a temperature of approximately 2050° F.

In making the above tests to determine whether the elements would retain their skeletal form, the elements only were subjected to the 2050° F. heat treatment and no attempt was made to determine the question as to whether the elements would bond to abutting surfaces to form a satisfactory bond therewith.

Tests were made in regard to this question, however, and elements processed as above when subjected to the ½ hour heat treatment at approximately 2050° F. in close contact with an abutting surface bonded therewith to form a satisfactory joint. Likewise elements comprising ⅓ ferrous and ⅔ copper powder bond satisfactorily to abutting surfaces under these conditions.

While elements comprising a mixture of ferrous and copper powder containing less than 5% copper powder (for example 2%) made by the procedure outlined above retained their skeletal shape when treated singly, they did not form a satisfactory bond when during the ½ hour 2050° F. heat treatment they were held in close contact with an abutting surface.

Where elements were made by the above procedure out of an intimate mixture comprising 75% copper powder and 25% ferrous powder they did not retain their shape when subjected to the said 2050° F. heat treatment. Since these connector elements are not shape retaining when they are used to bond together two abutting steel surfaces, the assembly does not retain its alignment and the element itself becomes very porous thereby losing strength.

All the above remarks that apply in the case of elements made from an intimate mixture of ferrous and copper powders apply in the same way and to the same extent for elements made by the same procedure from an intimate mixture of ferrous powder and bronze powder except that in the case of these latter elements the temperature of the ½ hour heat treatment was 2000° F. instead of 2050° F. The bronze powder used comprised approximately 90% copper and 10% tin.

In the case of the above mentioned elements made of an intimate mixture of ferrous and copper powders containing over 60% copper the aforesaid 2050° F. heat treatment was accomplished in an atmosphere comprising about 1% hydrogen and 99% argon, while in the case of elements made of an intimate mixture of ferrous and bronze powders the corresponding heat treatment atmosphere consisted of dissociated ammonia gas.

Referring to the drawings, Figs. 1 to 6 inclusive disclose groups of curves plotted to show the physical properties of elements produced under various pressures and with mixtures containing various percentages of bronze. In all cases the higher and lower melting constituents are iron and bronze respectively. Various kinds of iron may be used but the bronze is always the same except for variations in powder particle size, the composition being 90% copper and 10% tin. The data shown in Figs. 1, 2 and 3 relate to tensile strength, elongation and density respectively. Curves marked B represent test pieces made up of electrolytic iron of −100 mesh mixed with bronze of −150 mesh in the proportions indicated by the abscissa of the coordinate axes subjected first to a pressure of 27 tons per square inch, then to a sintering temperature of 1500° F. in dry hydrogen for one hour, then to repressing at 90 tons per square inch, and finally to resintering at 2000° F. in dry hydrogen for ½ hour. Curves marked C were obtained from pieces made up of electrolytic iron of −100 mesh plus bronze of −150 mesh which was first pressed at 27 tons per square inch, then sintered at 1500° F. in dry hydrogen for one hour, repressed at 90 tons per square inch, and finally resintered at 2000° F. in dry hydrogen for one minute. Curves marked D, D' were obtained from pieces made up of hydrogen-reduced iron plus −150 mesh bronze which were first subjected to a pressure of 27 tons per square inch, then sintered at 1500° F. for one hour in dry hydrogen, repressed at 90 tons per square inch, and finally resintered at 2000° F. in dry hydrogen in one instance D for two minutes and in the other D' for one-half hour. The curves marked E were obtained from pieces made up of mixtures of electrolytic iron of −400 mesh plus bronze of −300 mesh initially pressed at 27 tons per square inch, initially sintered at 1500° F. in dry hydrogen for one hour, finally pressed at 90 tons per square inch, and finally resintered at 2000° F. in dry hydrogen for one minute. The curves marked G were made from pieces consisting of electrolytic iron of −325 mesh plus bronze of −150 mesh initially pressed at 27 tons per square inch, initially sintered at 1500° F. in dry hydrogen for one hour, repressed at 90 tons per square inch, and resintered at 2000° F. in dry hydrogen for two minutes.

The curves plotted as Figs. 4 and 5 show characteristics of strength, elongation and density plotted against second pressings in tons per square inch as the abscissa. The curves marked A were produced from pieces consisting of electrolytic iron of −100 mesh plus 20% bronze of −150 mesh, initially pressed at 27 tons per square inch, initially sintered at 1500° F. in dry hydrogen for one hour, repressed at the pressures indicated along the abscissa, and then resintered at 2000° F. in dry hydrogen for one-half hour. The curves identified at F, F' were taken from pieces in which a single pressing was imparted thereto and was made up of electrolytic iron of −200 mesh plus 10% (F) or 20% (F') bronze of −150 mesh, initially pressed as indicated by the abscissa line of these curves and then sintered at 2000° F. in dry hydrogen for two minutes.

Figure 6:
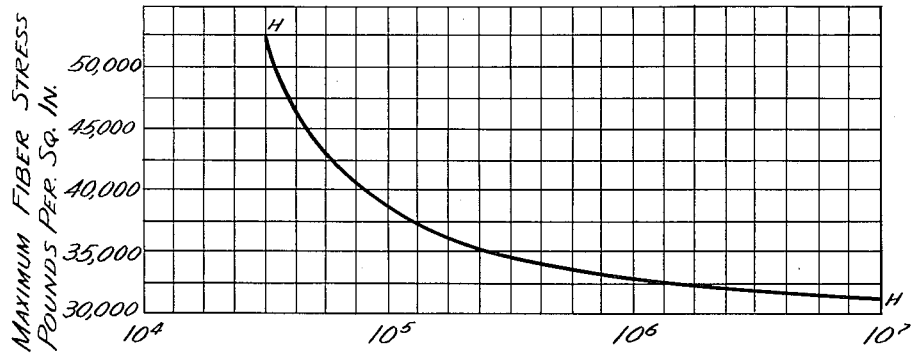
Fig. 6 is a curve showing maximum fiber stress in pounds per square inch plotted against the number of cycles of rotational stress necessary to cause rupture.

The final plotted curve in Fig. 6 represents a plotting of maximum fiber strength per square inch as ordinate against the number of cycles necessary to cause rupture as abscissa of pieces made up of electrolytic iron of −100 mesh plus 20% bronze of −150 mesh subjected to an initial pressing of 27 tons per square inch, an initial sintering at 1500° F. in dry hydrogen for one hour, a repressing at 90 tons per square inch, and a resintering at 2000° F. in dry hydrogen for one-half hour.

All of the data applies to double-pressed and double-sintered material except that shown by the curves marked F, Figs. 4 and 5, which apply to single-pressed and single-sintered material. In making the above elements, the loose powders are mixed to secure uniformity, preferably with a lubricant, for example 1% of powdered stearic acid.

The curves marked B and C, Figs. 1 and 2, together show the effect of changing the resintering time from one-half hour to one minute for varying amounts of bronze powder in the powder mixture. The piece sintered for one-half hour shows a tensile strength which increases very rapidly with increasing amounts of bronze up to about 5% and then a gradual decrease. When the resintering time is one minute, the tensile strength increases more slowly with increasing bronze to a maximum at about 20%, but in this case the maximum tensile strength is lower.

Comparison of the curves marked C and E, Figs. 1 and 2, shows the effect of changing the powder particle size when the resintering time is one minute. The curve E resulted from a piece made of −400 mesh iron with −300 mesh bronze, while the curve C resulted from a mixture of −100 mesh iron with −150 mesh bronze. It is to be observed that with the fine, the maximum tensile strength is higher and occurs at about 10% bronze whereas with the coarser powder the maximum tensile strength occurs at approximately 20% bronze. Curves D, D' show that when relatively impure iron powders are used the time of final sintering does not affect the physical properties of the product substantially.

Curve G, Figs. 1 and 2, shows the physical properties of pieces made with very fine electrolytic iron powder and −100 mesh bronze powder. This particular mixture has the highest tensile strength of any of them.

The curves A, Figs. 4 and 5, differ from the curves discussed above in that they show the physical properties plotted against various repressing pressures. These curves show that the physical properties improve with an increasing repressing pressure and that increased final densities are secured. In plotting the elongation, Figs. 5 and 9, a band rather than a single line is shown simply because the ordinance scale is extended. The width of the band indicates the expected variations in this property from one piece to another.

Curves F and F', Figs. 4 and 5, show the variations in physical properties of a single-pressed piece subjected to varying pressures for mixtures containing 10% bronze and 20% bronze respectively. The tensile strength and elongation of the 10% bronze piece increase with increasing pressing pressures.

The curve marked H, Fig. 6, shows the fatigue strength of a typical double-pressed piece. The abscissa represents the number of cycles necessary to break the specimen and the corresponding maximum fiber stress which is plotted as the ordinate. In this test the specimen is gripped at one end and a bending load is applied at the other end while the specimen is rotated. The number of cycles is counted during which the specimen will support the load without breaking.

Figure 7:
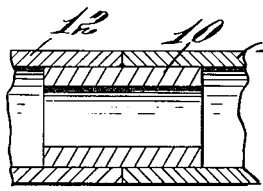
Fig. 7 is a longitudinal section through a pair of hollow members joined end to end in abutting relationship by a hollow, sleeve-like connector element interposed between the members.

Having described the characteristics of the connector element and its composition, specific applications thereof will now be described. In Fig. 7 the connector element 10 is shown in the form of a hollow sleeve interposed between the open ends of a pair of abutting hollow members 12, such as lengths of pipe or hollow electrical conductors. The connector element is shaped under pressure in accordance with the foregoing description. The connector element need not fit tightly in the open ends of the members 12. A free fit is desirable to avoid machining the parts to closer tolerances. The connector element should be long enough so that the surface contact of each member 12 with the connector element is greater than the cross-sectional area of the end of either of the members 12. After assembling the connector element and members, heat is applied to cause melting of the lower melting constituent of the connector element 10 with the result that expansion takes place accompanied by an alloying of the lower melting constituent of the connector element with the members 12. The expansion of the connector element 10 causes it to have intimate contact with the inner surfaces of the members 12 so as to take up any irregularities and residual spaces which may be present as well as the slight clearance between the same which is provided to permit ease of assembly, thus promoting alloying with the members. Such connector elements are susceptible of quantity production since close tolerances are not necessary, inexpensive, and afford means for quickly and simply joining the abutting ends of two members to form a joint of unusual strength without increasing the outside bulk of the joint.

Figure 8:
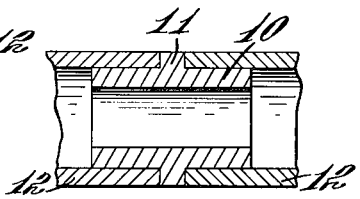
Fig. 8 is a longitudinal section through a pair of hollow members joined end to end with a hollow sleeve-like connector element interposed between the members.

Fig. 8 shows a modified form of the connector for connecting the conduits 12—12, wherein the element 10 is provided with a peripheral flange 11 for interposition between the adjacent ends of the conduits. This allows heat, developed externally to be applied directly to the connector element.

Figure 9:
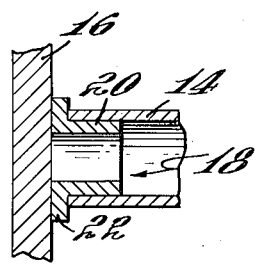
Fig. 9 is a section showing a hollow member joined to a flat plate with a connector element interposed between them having a neck for engagement within the hollow member and a flange for engagement with the plate.

In Fig. 9 a hollow member 14 in the form of a sleeve is shown joined to a flat plate 16 by means of a connector element 18 having a cylindrical neck-like portion 20 shaped to fit into the open end of the hollow member 14 and to have close surface contact with its internal surface, and a flange-like portion 22 for contact with the surface of the plate. While the connector element 18 is illustrated as being made hollow, it is obvious that it could be solid.

Figure 10:
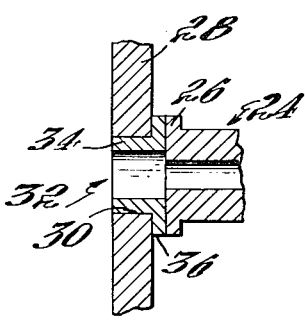
Fig. 10 is a section showing a flanged element joined to a plate having a hole in it over which the flanged element is placed by a connector element having a neck for engagement with the hole and a flange for engagement with the end of the flanged element.

Fig. 10 shows a member 24 having an end flange 26 joined to a flat plate 28 having a hole 30 therein over which the end of the member is disposed. To unite the parts, a connector element 32 is employed, having a neck portion 34 adapted to enter the hole 30 in the plate, and a flange 36 adapted to be interposed between the plate and the flange 26 on the member 24.

A specific application of the connector element to the manufacture of crankshafts is shown in Figs. 12 to 19 inclusive, wherein in one form it is employed for connecting a hollow crank pin to a crank arm without forming an aperture in the crank arm for reception of the end of the pin. A portion of a conventional crankshaft assembly is shown in Fig. 11 wherein there are main bearings 38, crank arms 40 and a crank pin 42 connected between the free ends of the arms. The crank pin, as shown in Fig. 12, is hollow and is joined at its opposite ends to the flat opposed surfaces of the crank arm by way of the connector elements 44. As illustrated herein, each connector element 44 is in the form of a bushing having a sleeve portion 46 of such size as to fit closely within the open neck of the crank pin and a flange portion 48 which extends laterally from the neck portion for engagement with the flat inner face of the crank arm. The neck portion is of sufficient length to engage the inner peripheral surface of the crank pin over an area which is substantially greater than the cross-sectional area of the end of the pin. The area of the end face of the flange 48 which engages the crank arm is also of considerably larger area than the cross-sectional area of the end of the crank pin. Each element is assembled together with a crank and pin by slipping the neck portion 46 into the open end of the pin and bringing the pin and element into abutting engagement with the crank arm at the proper position, clamping the members in position and then surrounding the joint by an induction heater 50 such as shown in Fig. 19. The temperature is raised until the melting point of the lower melting powder of the connector element is reached, whereupon the neck 28 expands into the end of the pin and becomes bonded thereto. At the same time an alloying of the metal of the neck and flange portion of the element with the pin and crank will take place. The allowable tolerances between the parts prior to assembly is such that no special apparatus is necesary to fit the parts together and yet a rigid joint of high strength is secured.

To facilitate locating the crank pin and crank it may be desirable to provide locating means in the form of spaced recesses 52, Fig. 13, in the face of the crank arm to which the pin is to be attached and correspondingly spaced nubs 56 on the exposed face of the flange 48 as illustrated in Figs. 15 and 16. By positioning the recesses 52 concentrically with relation to the point thereon at which the axis of the crank pin is to be connected and the nubs 56 concentric to the axis of the neck 46, the pin may be easily assembled with the crank arm in the proper position merely by inserting the neck of the connector element into the end of the crank pin and then seating the nubs in the recesses. The nubs not only function as locating means, but also serve to some extent to strengthen the joint between the connector and the crank in that they provide a more extensive bonding surface.

In a somewhat modified form, Fig. 14, in lieu of the recess 52, a shallow annular recess 58 is formed in the face of the crank concentric with the intended axis of the pin for reception of the flanged portion 48 of the connector element. Since the flange 48 is concentric with the axis of the neck of the connector element when the parts are assembled, the axis of the pin will be properly located with respect to the crank arm.

The crankshaft just described is constructed by manufacturing the crank arms, pins and bearings separately and then joining the pins and bearings to the arm. Alternatively, as shown in Fig. 17, an arm 60 and part of the crank pin or bearing may be made integral, preferably an arm and one half of a pin or bearing, whereupon an annular connector element 64 is interposed between the adjacent faces of the half pins or bearings and the parts are permanently joined by heating the assembly to the melting point of the lower melting constituent as described heretofore. The annulus may have short neck portions 66 which extend a short distance into the open ends of the pins to assist in assembling the parts and also to improve the bond, although in some cases these may be omitted.

While most any means may be employed for holding the members together during the application of heat to form the joint, a convenient device is shown in Figs. 12, 13 and 14. This comprises forming apertures 68 through the crank arms concentric with the axis of the crank pin and inserting a hollow tube 70 of relatively soft metal through these apertures and through the pin and then peening the ends as shown at 72. This provides a temporary connection which may readily be removed by straightening the peened portion 72 at one end, withdrawing the tube from the assembled parts.

The heating element 74 previously referred to, which may be used for forming the joint in the crankshaft assembly, is an induction heater comprised of two arms 76 pivoted at 78 so that they may readily be placed about the joint. The heating element is supplied with electric energy through conventional conductors 80 which also conduct cooling fluid.

It should be understood that the present disclosure is for the purpose of illustration only and that this invention includes all modifications and equivalents which fall within the scope of the appended claims. This application forms a continuation-in-part of our pending application, Serial No. 36,366, filed July 1, 1948.

We claim:

1. An integrated composite structure comprising a plurality of ferrous metal components, adjacent components being joined together by a connector element, each connector element consisting essentially of a preformed, powdered metal compact composed of 5% to ⅔ part of a low melting constituent and from 95% to ⅓ part of a high melting constituent, the high melting constituent consisting of a ferrous metal, the lower melting constituent being a material selected from the group consisting of copper, bronze and copper-tin mixtures in which the copper predominates, the high melting constituent providing a shape-retaining skeletal structure bonded to said components by said low melting constituent, characterized in that at least one of a pair of adjacent components has an opening therein bordered by an exposed surface opposite which is located the other component, and that the connector element has a bonding portion extending into the opening, which is of such shape as to have intimate surface contact with the internal surface of said opening.

2. An integrated composite structure according to claim 1 in which both adjacent components have substantially registering holes therein, and the connector element has body portions extending into said holes, said bonding portions being of such shape as to have intimate engagement with the internal surfaces of said holes.

3. An integrated composite structure according to claim 1 in which both adjacent components have substantially registering holes therein, the portions of said components bordering said holes being opposed and the connector element having bonding portions extending into said holes and having intimate engagement with the internal surfaces of said holes, and another bonding portion comprising a flange-like section intermediate the portions engaged within the holes, the opposite sides of said flange-like section having intimate engagement with the opposed marginal surfaces of the components bordering said holes.

4. An integrated composite structure according to claim 1 in which one component has an opening therein around which is a bordering surface, and the other has a flat surface arranged opposite the opening and the bordering surface, and the connector element has a cylindrical body portion extending into the opening into intimate engagement with the internal surface of the opening, and an integral, radially extending flange, the opposite sides of which are in intimate surface contact with the surface bordering the opening and the surface of the other component.

References Cited in the file of this patent

UNITED STATES PATENTS

| | | |
|---|---|---|
| 1,188,485 | Pruyn | June 27, 1916 |
| 1,219,139 | Murray | Mar. 13, 1917 |
| 1,518,610 | Steenstrup | Dec. 9, 1924 |
| 1,587,445 | Thomson | June 1, 1926 |
| 1,896,939 | Calkins | Feb. 7, 1933 |
| 1,921,642 | Stephenson | Aug. 8, 1933 |
| 2,125,324 | Williams | Aug. 2, 1938 |
| 2,225,451 | Hirth | Dec. 17, 1940 |
| 2,364,109 | Taylor | Dec. 5, 1944 |
| 2,401,483 | Hensel | June 4, 1946 |